(No Model.)
P. L. LABARBE.
APPARATUS FOR COOKING EGGS BY HOT AIR.
No. 248,100. Patented Oct. 11, 1881.
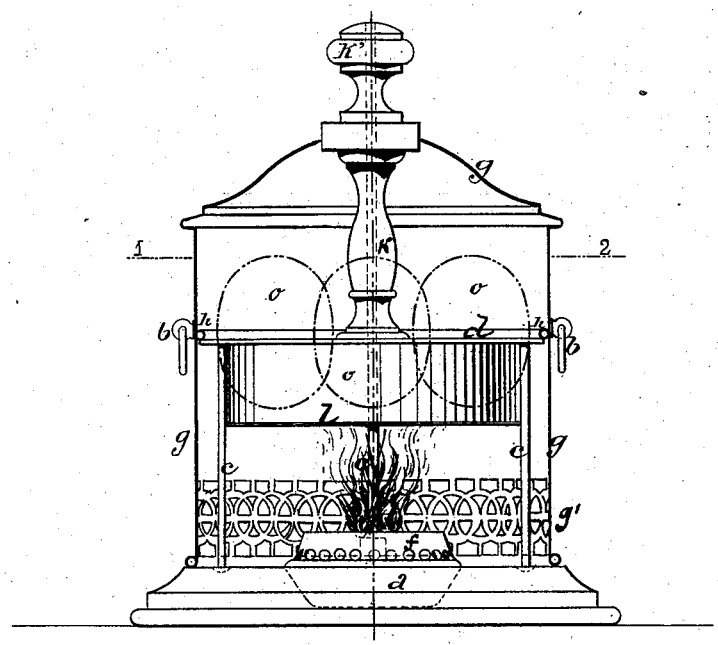
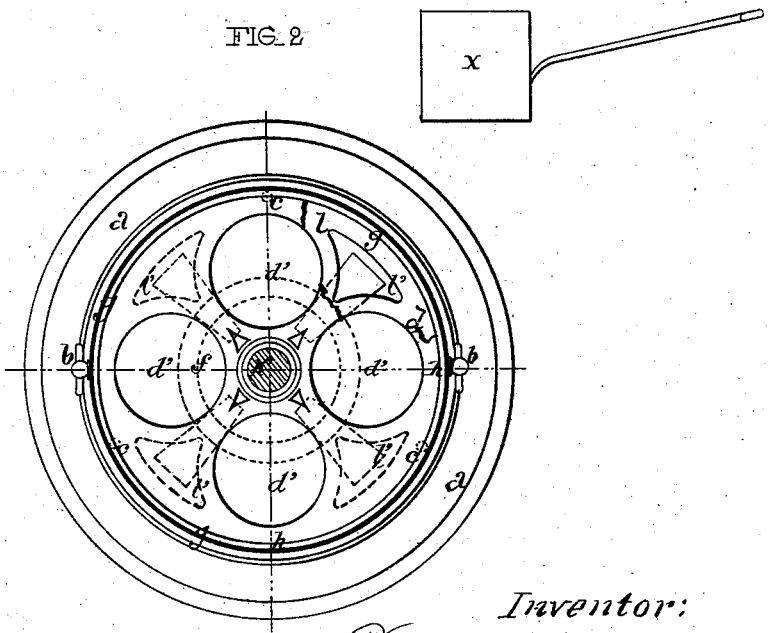
Witnesses:
John C. Tunbridge
Willy H. ...
Inventor:
Pierre L. Labarbe.
By his attorneys
Briesen & Betts

United States Patent Office.

PIERRE LÉON LABARBE, OF PARIS, FRANCE.

APPARATUS FOR COOKING EGGS BY HOT AIR.

SPECIFICATION forming part of Letters Patent No. 248,100, dated October 11, 1881.

Application filed July 18, 1881. (No model.) Patented in France April 5, 1881.

*To all whom it may concern:*

Be it known that I, PIERRE LÉON LABARBE, of Paris, in the Republic of France, have invented a new or Improved Apparatus for Cooking Eggs by Hot Air, (for which I have obtained Letters Patent of France for fifteen years, dated April 5, 1881, No. 142,136;) and I do hereby declare that the following is a full and exact description thereof, reference being made to the accompanying drawings.

In the application for cooking eggs by hot air I have devised an apparatus which consists, first, in a supporting-foot maintaining the eggs above a small flame; and, secondly, in a cover which surrounds the eggs and allows the exterior air to penetrate to the flame. Air thus acquires the desired degree of heat, and the eggs are uniformly cooked as required. If the heat is derived from the combustion of alcohol or spirits of wine, it is easy to measure the quantity of liquid to be burned, to any particular degree, and any number of eggs. Similarly, if the heat is derived from candles, gas, or other combustible, sand-glasses, clepsydras, &c., can be arranged, which will stop the combustion at the precise moment.

Figure 1 shows the interior of the apparatus, the case being shown in section. Fig. 2 is a horizontal section on line 1 2 of Fig. 1. Fig. 3 is an elevation of the measure or gage for measuring the liquid to be burned and for pouring the same into the lamp.

On the foot $a$ are secured series of supports $c$, upon which rests the disk $d$, perforated with holes $d'$, and intended to receive the eggs $o$ to be cooked. From the disk $d$ rises the column $k$, which is surmounted by the button $k'$, for handling the apparatus.

Below the disk $d$, at a suitable height, is fixed another disk, $l$, perforated with openings $l'$, which alternate with the openings $d'$. The heat produced by the combustion of the lamp can only pass through these openings in order to reach the eggs.

The spirit-lamp $f$ is let into the foot $a$. It is preferably furnished with an asbestus wick. $g$ is the outer case of the apparatus. The case $g$ is provided with an internal wire ring, $h$, which rests on the disk $d$, and which limits the descent of the case $g$ and prevents the entrance of cold air into the upper part of the apparatus. The case $g$ is furnished below the disk $l$ with the perforated gallery $g'$, for the purpose of admitting into the apparatus the air necessary for the combustion of the lamp, and for the escape of products of combustion. The removal and putting in place of the case $g$ is effected by grasping the rings or handles $b$ $b$.

To use the apparatus the case $g$ is removed in order to put the eggs in place, the required quantity of alcohol is put into the lamp by means of the measure or gage $x$, Fig. 3, and the lamp is lighted. The case is immediately put in place, and when it is seen by looking through the open gallery $g'$ that the lamp is no longer lighted the eggs are cooked to the required degree.

In conclusion, I may remark that the application of hot air for cooking eggs may be effected by means of apparatus more or less similar to that shown in the annexed drawings, but varied according to the nature of the combustible employed, also as to the forms and materials of the constituent parts of the apparatus according as it is desired to produce a rich or a cheap article, varied also according to whether the apparatus is to be used or not for serving the cooked eggs at table.

In accordance with the preceding statement, I consider as my invention and claim—

The apparatus for cooking eggs by hot air, consisting of the support $a$ $c$, perforated disks $d$ and $l$, case $g$, and lamp $f$, substantially as herein shown and described.

PIERRE LÉON LABARBE.

Witnesses:
A. BLÉTRY,
ACH. JOLLET.